S. P. LEVERICH.
FENCE WIRE STRETCHER.
APPLICATION FILED APR. 8, 1916.
1,185,212.
Patented May 30, 1916.
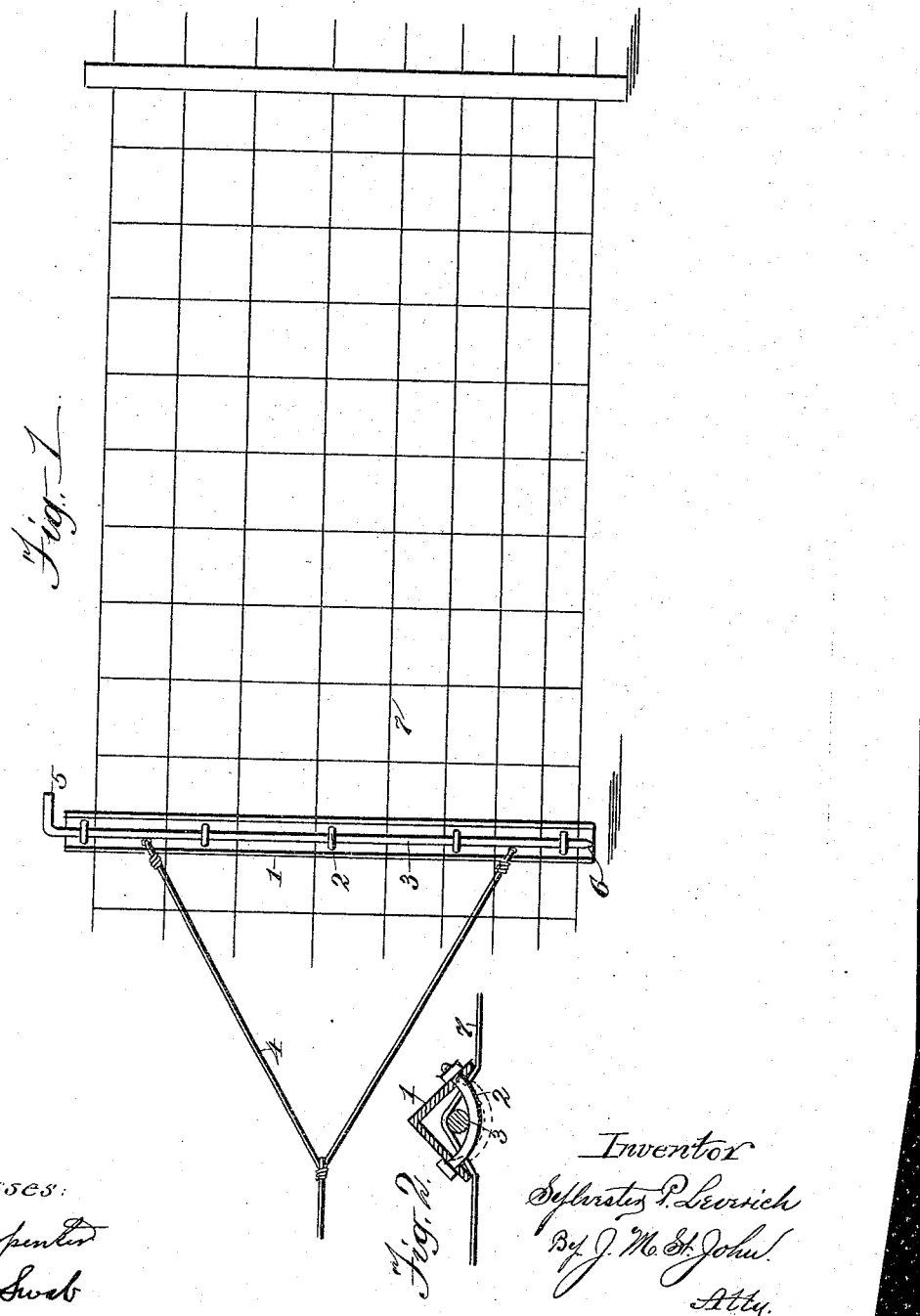

UNITED STATES PATENT OFFICE.

SYLVESTER P. LEVERICH, OF MARION, IOWA.

FENCE-WIRE STRETCHER.

1,185,212.  Specification of Letters Patent.  Patented May 30, 1916.

Application filed April 8, 1916. Serial No. 89,793.

*To all whom it may concern:*

Be it known that I, SYLVESTER P. LEVERICH, a citizen of the United States, residing at Marion, in the county of Linn and State of Iowa, have invented certain new and useful Improvements in Fence-Wire Stretchers; and I do hereby declare the following to be a full, clear, and exact description of the invention, such as will enable others skilled in the art to which it appertains to make and use the same.

This invention relates to fence-wire stretchers; and the object of the invention is to provide a simple and inexpensive device adapted for the stretching of all the strands in a fence, and more particularly in one made of woven wire.

The nature of the invention is fully disclosed in the description and claims following, reference being had to the accompanying drawing, in which—

Figure 1 is a side view illustrating my improved stretcher as in use. Fig. 2 is a cross-section of the same in the line of one of its bridges.

The device is very simple, consisting of an angle bar 1, with bridges 2 at intervals across its open side, and a rod 3 of practically the same length as the bar. To the bar is attached the pulling cable 4, to which stress may be applied in any suitable way. In practice the body of the device is a length of angle-bar, and the bridges are curved bolts, as shown in Fig. 2, the bolts passing through holes in the flanges of the bar. The fence-wires 7 are gripped for stretching by crimping inwardly across the edges of the bar, the crimps being held by the rod 3. For convenience in handling, the rod should have a handle 5, and its other end should be pointed, as shown at 6, so as to be easily thrust between the wires and the bridges. The curvature of the bridges may be greater than is shown in the main outline in Fig. 2, as indicated by the dotted lines, which would of course produce less crimp in wires of the same gage as shown, but would admit of the pointed rod being thrust straight down with the wires lying straight across the edges of the bar. In the use of the stretcher as illustrated in full outline, the wires are supposed to be bent somewhat before being inserted in the stretcher. Since this may generally be done, the pointing of the rod is not indispensable.

The compound bends in the wires enables the stretcher to hold them very firmly and uniformly, so that an even stress may be applied to all the wires in the fence simultaneously. This manner of holding fence wires for stretching is not claimed, but only the simple, easily manufactured and inexpensive device herein shown and described.

Having thus described my invention, I claim:

1. In a fence-wire stretcher, the combination of an angle bar having curved bridges secured in holes formed in the sides of said bar, and a crimping rod adapted to be thrust under said bridges and hold the wires crimped behind it and across the edges of the bar.

2. The described fence-wire stretcher, consisting of an angle-bar, a series of curved bolts passing through holes in the flanges of the bar and serving as bridges from flange to flange, and a pointed rod adapted to be thrust between the crimped fence-wires and said bridges.

In testimony whereof I affix my signature in presence of two witnesses.

SYLVESTER P. LEVERICH.

Witnesses:
A. T. COOPER,
J. M. ST. JOHN.

Copies of this patent may be obtained for five cents each, by addressing the "Commissioner of Patents, Washington, D. C."